Figure 1:
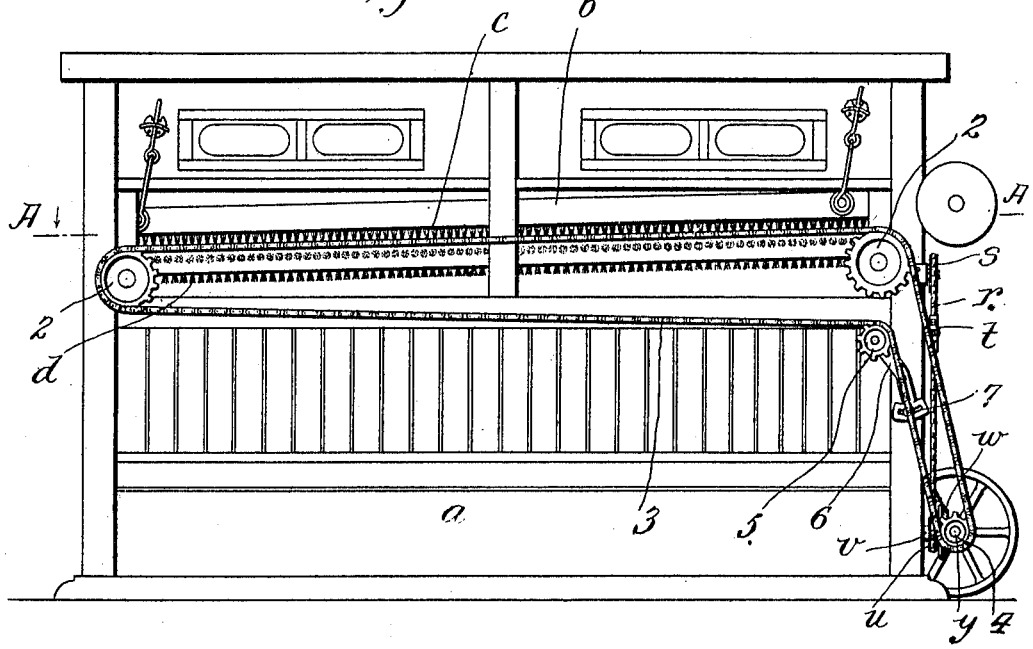

J. H. SMELZER.
MIDDLINGS PURIFIER.
APPLICATION FILED JUNE 5, 1909.

984,307.

Patented Feb. 14, 1911.
2 SHEETS—SHEET 1.

J. H. SMELZER.
MIDDLINGS PURIFIER.
APPLICATION FILED JUNE 5, 1909.
984,307.
Patented Feb. 14, 1911.
2 SHEETS—SHEET 2.
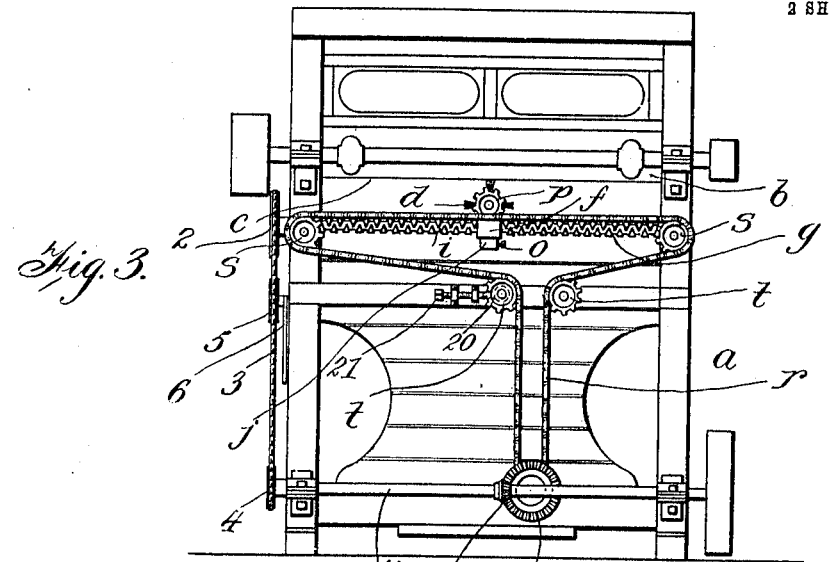

UNITED STATES PATENT OFFICE.

JOHN HAMILTON SMELZER, OF WESTMOUNT, QUEBEC, CANADA.

MIDDLINGS-PURIFIER.

984,307.

Specification of Letters Patent. Patented Feb. 14, 1911.

Application filed June 5, 1909. Serial No. 500,350.

*To all whom it may concern:*

Be it known that I, JOHN HAMILTON SMELZER, of the city of Westmount, Province of Quebec, Canada, have invented certain new and useful Improvements in Middlings-Purifiers; and I do hereby declare that the following is a full, clear, and exact description of the same.

The invention may be said briefly to consist of the several combinations and arrangements of parts hereinafter described and pointed out in the claims.

Figure 2:
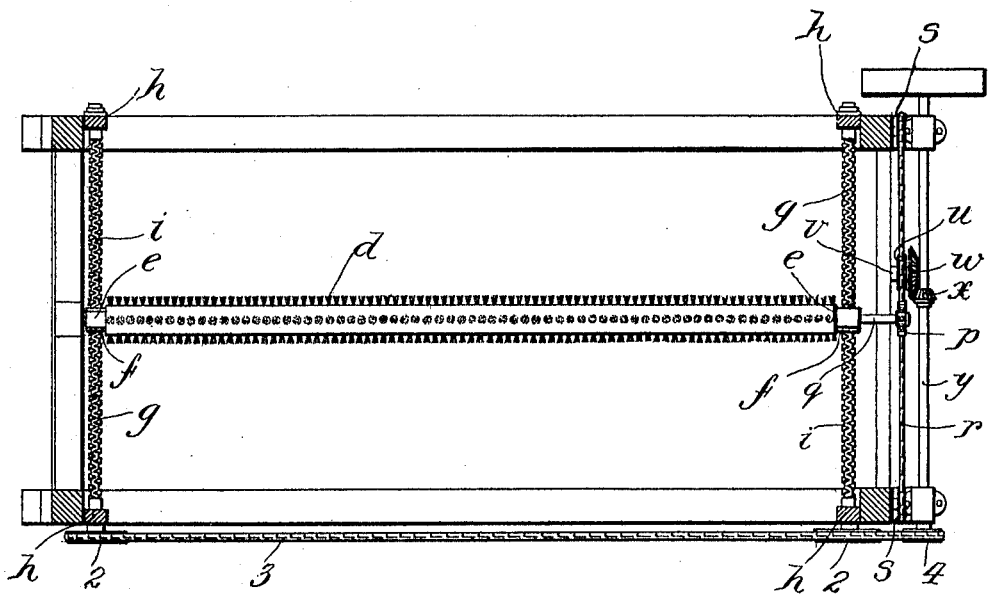

For full comprehension, however, of my invention reference must be had to the accompanying drawings forming a part of this specification and in which similar reference characters indicate the same parts and wherein:

Figure 1 is a side elevation of my improved middlings purifier; Fig. 2 is a longitudinal sectional view taken on line A. A. Fig. 1; Fig. 3 is an end elevation of the machine; Fig. 4 is a side elevation partly in section, of my improved carrying head; Fig. 5 illustrates such bearing head in side elevation at right angles to Fig. 4 and partly in sectional view; Fig. 6 is a transverse sectional view taken on line B. B. Fig. 4; Fig. 7 is a bottom plan view of the head.

The machine to which my invention has particular reference comprises a frame, $a$, supporting a vibratory screen $b$ the cloth $c$ of which is cleansed by a brush.

According to this invention the brush $d$ is of the rotary type and rotated continually in the same direction and reciprocated laterally in bearing relation with the underside of the gauze or cloth of the screen $b$. The brush is supported at its opposite ends in bearings $e$ formed integrally with a pair of heads $f$ cored out to fit slidably upon a pair of shafts $g$ rotatably supported in bearings $h$ on the frame of the machine at the opposite ends of the latter. Each of these shafts is formed with a thread $i$ the ends whereof are taken around the shaft to form a continuous path leading back into the main thread.

The heads have downwardly extending bosses $j$ each chambered to accommodate an oscillatory key presenting a feather $k$ engaging the thread of the shaft, and a stem $m$; such key being supported in place by a bushing $n$ secured against displacement in the boss by a set screw $o$ the feather resting on the top of the bushing.

The brush is rotated continually in the same direction by a sprocket wheel $p$ mounted rigidly upon the trunnion $q$ of such brush, and an endless chain $r$ engaging the sprocket wheel $p$ and looped around a pair of guiding sprocket wheels $s$, and taken down between a second pair of guiding sprocket wheels $t$ to and looped at its lower end around a driving sprocket wheel $u$ mounted rigidly upon a shaft $v$ having also rigidly mounted thereon a large gear wheel $w$ intermeshing with a smaller gear wheel $x$ fixed upon the pulley shaft $y$ of the machine. This chain has its slack taken up by one of the sprocket wheels $t$ which is mounted for the purpose in an adjusted bearing 20 operated by a set screw 21.

The shafts $g$ are driven by sprocket wheels 2 mounted rigidly on one end thereof, and an endless chain 3 looped around such sprocket wheels and a sprocket wheel 4 secured upon one end of the pulley shaft $y$. This chain has its slack taken up by a sprocket wheel 5 mounted on a bracket 6 adjustably secured as at 7 to the frame of the machine.

Operation: The operation of the brush driven according to my invention is as follows: The pulley shaft rotates continually in the same direction and its power is transmitted to the brush through bevel gears $w$ and $x$ shaft $v$, sprocket wheel $u$ chain $r$, sprocket wheels $s$, and sprocket wheel $p$ upon the brush, the effect being that the latter is caused to also rotate continually in the same direction. Simultaneously with this rotation of the brush it is reciprocated laterally by the screw shafts $g$ which are driven from the said pulley shaft through the sprocket wheel 4, chain 3, and sprocket wheels 2. The peripheral speed of the brush is such that there will be a brushing action exerted thereby upon the gauze or cloth of the screen even when the lateral movement of the brush is in the opposite direction to the rotative movement of its upper side. The principal advantage of this construction is that as the brush rotates continually in the same direction its bristles never penetrates the gauze or cloth, while the latter is kept practically free from clogging dirt on its top surface.

What I claim is as follows:—

1. In a middlings purifier, the combination with the screen thereof, of a rotary brush in bearing relation with and extending from end to end of the said screen, a pair of transverse shafts having return screw-threads, a pair of heads slidably mounted on such shafts, means carried by such heads and engaging the screw-threads of the shafts, such heads presenting bearings supporting the brush, means for rotating said shafts, and means for rotating the said brush throughout the reciprocatory movements of said brush relatively to the screen, substantially as described.

2. In a middlings purifier, the combination with the screen thereof, of a rotary brush in bearing relation with and extending from end to end of the said screen, a pair of transverse shafts having return screw-threads, a pair of heads slidably mounted on such shaft, means carried by such heads and engaging the screw-threads of the shafts, such heads presenting bearings supporting the brush, means for rotating said shafts, and means for rotating the brush continually in the same direction throughout the reciprocatory movements of said brush relatively to the screen, substantially as described.

3. In a middlings purifier, the combination with the screen thereof, of a rotary brush in bearing relation with and extending from end to end of the said screen, a sprocket wheel secured upon one end of the brush, an endless chain engaging such sprocket wheel, means for driving the chain continually in the same direction, a pair of transverse shafts having return screw-threads, a pair of heads slidably mounted on such shafts, means within the said heads and engaging the screw-threads of the shafts, such heads presenting bearings supporting the brush and means for rotating said shafts, substantially as described.

4. In a middlings purifier, the combination with the screen thereof, of a rotary brush in bearing relation with and extending from end to end of the said screen, a sprocket wheel secured upon one end of the brush, an endless chain engaging such sprocket wheel, means for driving the chain continually in the same direction, a pair of transverse shafts having return screw-threads, a pair of heads slidably mounted on such shafts, sprocket wheels mounted upon the shafts, a driving shaft having a sprocket wheel fixed thereon, an endless chain looped around and operatively connecting the said sprocket wheels, such heads presenting bearings supporting the brush, means for rotating the said shafts, and means for rotating the brush continually in the same direction, substantially as described.

In testimony whereof, I have signed my name to this specification, in the presence of two subscribing witnesses.

JOHN HAMILTON SMELZER.

Witnesses:
WILLIAM P. McFEAT,
FRED. J. SEARS.